(12) United States Patent
Laddha

(10) Patent No.: US 11,946,411 B2
(45) Date of Patent: Apr. 2, 2024

(54) VEHICLE WHEEL ROTATION APPARATUS

(71) Applicant: Pramod Laddha, Nagpur (IN)

(72) Inventor: Pramod Laddha, Nagpur (IN)

(73) Assignee: Pramod Laddha, Nagpur (IN)

( * ) Notice: Subject to any disclaimer, the term of this patent is extended or adjusted under 35 U.S.C. 154(b) by 0 days.

(21) Appl. No.: 17/778,005

(22) PCT Filed: Aug. 4, 2020

(86) PCT No.: PCT/IB2020/057355
§ 371 (c)(1),
(2) Date: May 19, 2022

(87) PCT Pub. No.: WO2021/152362
PCT Pub. Date: Aug. 5, 2021

(65) Prior Publication Data
US 2022/0412253 A1  Dec. 29, 2022

(30) Foreign Application Priority Data

Jan. 27, 2020  (IN) ............................. 202021003613

(51) Int. Cl.
*F02C 3/04*  (2006.01)

(52) U.S. Cl.
CPC ............ *F02C 3/04* (2013.01); *F05D 2220/62* (2013.01)

(58) Field of Classification Search
CPC .... F02C 3/04; F02C 3/165; F02C 5/06; F02C 5/12; F01D 1/026; F01D 1/34; F05D 2220/62; F02B 39/02; Y02T 10/12; Y02T 50/60
See application file for complete search history.

(56) References Cited

U.S. PATENT DOCUMENTS

| 1,252,369 | A | * | 1/1918 | Wondra | ..................... F02C 5/12 60/39.4 |
| 3,250,068 | A | * | 5/1966 | Vulliamy | .............. F02B 37/013 60/602 |
| 6,351,946 | B1 | * | 3/2002 | Faletti | ..................... F02B 37/22 60/605.2 |

FOREIGN PATENT DOCUMENTS

| CN | 101493015 A | * | 7/2009 | ............... F01D 1/02 |
| WO | 2015122799 A1 |  | 8/2015 |  |

* cited by examiner

*Primary Examiner* — Loren C Edwards
(74) *Attorney, Agent, or Firm* — MASCHOFF BRENNAN; Paul G. Johnson

(57) ABSTRACT

The present disclosure describes an improved vehicle wheel rotation apparatus. The apparatus 300 comprises a combustion chamber 301, one or more turbines (302,311) and at least one non-return valve 306. An auxiliary attachment 305 is retrofitted at surface of each bar 304 present in each turbine. The auxiliary attachment 305 comprises 3-tube arrangement, wherein two tubes (305a, 305b) of the attachment 305 enable entry of jet of exhaust gases into the attachment 305 and further facilitate the plurality of bars 304 for initiating rotation of the runner 303. The jet of exhaust gases, exiting the attachment 305 through last tube 305c, comprises reducing cross-section near opening, enabling further increment in velocity of exhaust gas, resulting in thrust to the bar 304 to which the attachment 305 is already fitted, thus providing additional rotations to the runner 303 and eventually to one or more wheels of the vehicle.

10 Claims, 3 Drawing Sheets

VEHICLE WHEEL ROTATION APPARATUS

CROSS-REFERENCE TO RELATED APPLICATIONS AND PRIORITY

The present application claims priority from Indian Provisional Patent Application number 202021003613 filed on 27 Jan. 2020; and PCT WIPO 2021/152362 A1 filed on Aug. 4, 2020, the entire contents of both of which are hereby incorporated by reference in their entirety.

TECHNICAL FIELD

The present invention in general relates to a field of mechanical engineering. More particularly, the invention relates to an improved vehicle wheel rotation apparatus.

BACKGROUND

Background description includes information that may be useful in understanding the present invention. It is not an admission that any of the information provided herein is prior art or relevant to the presently claimed invention, or that any publication specifically or implicitly referenced is prior art.

In most of the existing engines, there are lots of components that work together and/or independently. Due to large number of components, total input energy is not converted into work as some of the components require comparatively more input energy. Hence, there is always some energy loss while running/using the engine, sometimes even for running the engine itself. For example, some energy is lost in movement of a piston within the bore. In other words, efficiency of the engine is not attainable to the fullest, compared to the input energy. Furthermore, there persists a very common problem of frequent maintenance and its cost as well. Usually, when there are lots of moving components, the maintenance cost is high.

In case of vehicles, hot gases are exhausted and are thrown to the environment. Such gases are wasted as these hot gases also carry along the energy which they possess from fuel combustion. There is, therefore, a need in the art to provide an apparatus/system which can provide much increased efficiency and thus a solution to the above mentioned problems.

SUMMARY

Before the present apparatuses, methods and systems along with components related thereto are described, it is to be understood that this disclosure is not limited to the particular methods, apparatuses, systems and their arrangement as described, as there can be multiple possible embodiments which are not expressly illustrated in the present disclosure but may still be practicable within the scope of the invention. It is also to be understood that the terminology used in the description is for the purpose of describing the particular versions or embodiments only, and is not intended to limit the scope of the present application. This summary is not intended to identify essential features of the subject matter nor it is intended for use in detecting or limiting the scope of the subject matter.

In one embodiment, an improved vehicle wheel rotation apparatus is described. The apparatus may comprise a combustion chamber and one or more turbines. The combustion chamber may comprise one or more inlet for fuel and air, and an outlet port. Each turbine may comprise casing/housing, a runner, an inlet port and an outlet port. Plurality of bars may be attached to the runner of each turbine. The runner may be mounted on one end of a shaft and other end of the shaft may be coupled to an axle of the vehicle. The apparatus may be characterized by an auxiliary attachment that may be retrofitted at surface of each bar present in each turbine. The auxiliary attachment may comprise 3-tube arrangement. Two tubes of the may enable entry of jet of exhaust gases into the attachment and further facilitating the plurality of bars for initiating rotation of the runner. A non-return valve may be placed at entry of the two tubes. A jet of exhaust gases from the combustion chamber may pass in the attachment via the non-return valve. The jet of exhaust gases that exits the attachment through last tube, with reducing cross-section near opening, may further enable increment in velocity of exhaust gas, resulting in thrust to the bar to which the attachment is already fitted, thus providing additional rotations to the runner and eventually to the one or more wheels of the vehicle.

In another embodiment, an improved vehicle wheel rotation apparatus is described. The apparatus may comprise a combustion chamber and one or more turbines. The combustion chamber may comprise one or more inlet for fuel and air, and an outlet port. Each turbine may comprise casing/housing, a runner, an inlet port and an outlet port. Plurality of bars may be attached to the runner of each turbine. The runner may be mounted on one end of a shaft and other end of the shaft may be coupled to an axle of the vehicle. A non-return valve may be placed between the outlet port of the combustion chamber and inlet port of the turbine. A jet of exhaust gases from the combustion chamber may pass towards the turbine via the non-return valve. The apparatus may be characterized by at least one tube that may be retrofitted at surface of each bar present in each turbine. An axis of the at least one tube and axis of the respective bar may be in orthogonal alignment. One end of the at least one tube may be closed with the bar and other end enables entry of jet of exhaust gases into the tube, facilitating the plurality of bars for initiating rotation of the runner, further resulting in thrust to the bar to which the tube is already fitted, thus providing additional rotations to the runner and eventually to the one or more wheels of the vehicle.

DESCRIPTION OF INVENTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present disclosure relates to an improved vehicle wheel rotation apparatus that may provide either primary or additional power/energy to one or more wheels of the vehicle. The apparatus may be mounted/installed on the chassis of the vehicle. The apparatus may be placed near the one or more wheels of the vehicle. The apparatus may also be considered as an alternative solution to conventional heavy engines that require lot of automotive components.

Figure 1:
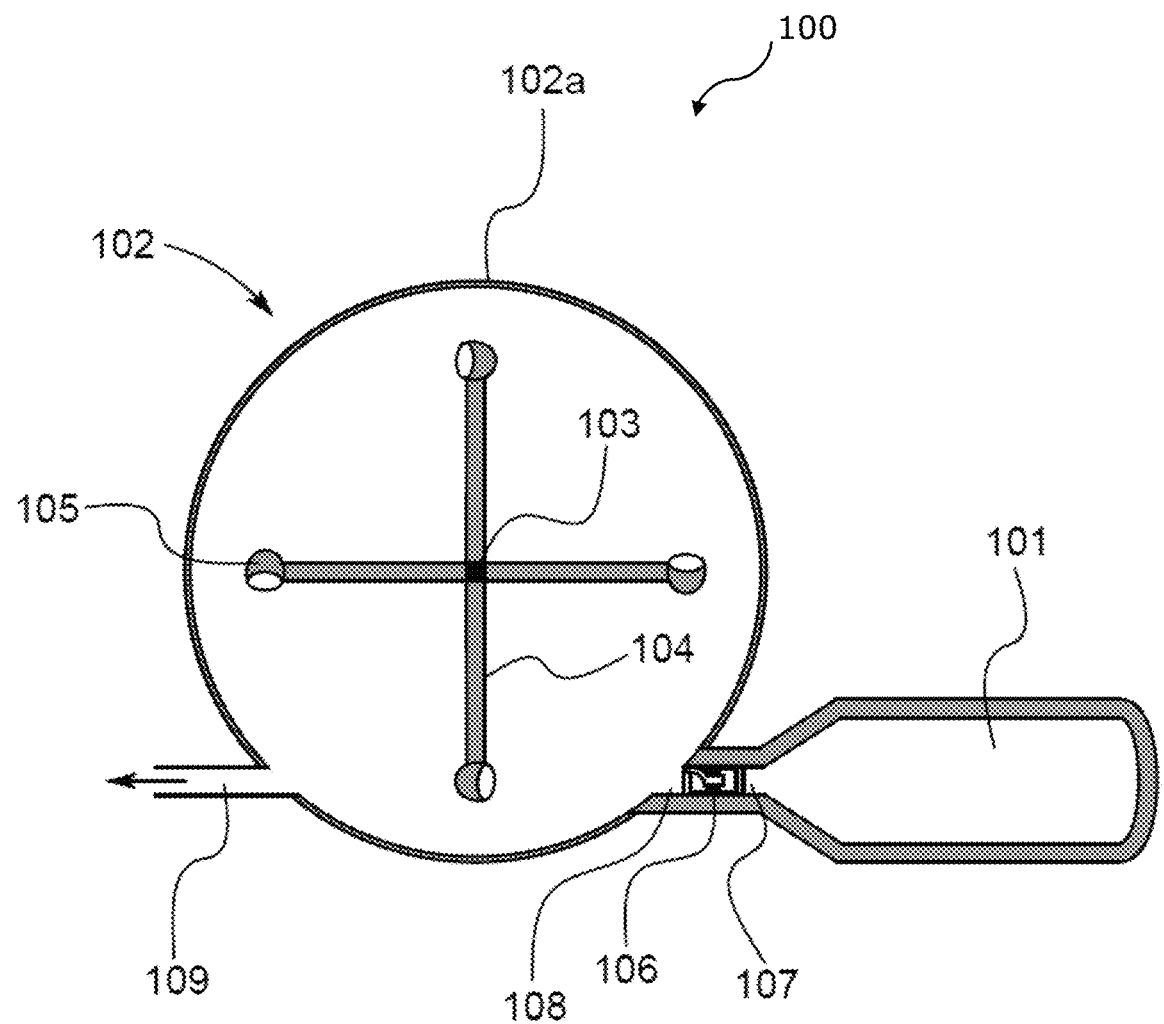
FIG. 1 illustrates a vehicle wheel rotation apparatus 100, in accordance to one embodiment of the present disclosure.

FIG. 1 illustrates a vehicle wheel rotation apparatus 100, in accordance to the present disclosure. The vehicle wheel rotation apparatus 100 may comprise a combustion chamber 101 and one or more turbines 102. The combustion chamber 101 may comprise two inlet ports (not shown) and one outlet port 107. One of the two inlet ports may be connected to the fuel pump or fuel tank of the vehicle. Another inlet port may enable entry of air into the combustion chamber through a fan/blower (not shown). The combustion chamber 101 may be utilized for combustion/burning of fuel along with air, thus forming the exhaust gases.

The outlet port 107 of the combustion chamber 101 may comprise a narrow opening that may further enable the exhaust gases to come out with high force and/or high velocity. In other words, the exit of the high velocity exhaust gases from the outlet port 107 of the combustion chamber 101 may also form a jet/stream of exhaust gases.

In one embodiment, the turbine 102 may comprise a casing/housing 102a, a runner 103, plurality of rods/bars 104, plurality of buckets/vanes 105, an inlet port 108 and outlet port 109. The runner 103 of the turbine 102 may be mounted on a shaft which may be also coupled to the shaft/axle of the vehicle in order to rotate the one or more wheels of the vehicle. The plurality of rods/bars 104 may be connected to the runner 103. One end of each rod/bar 104 may be connected to the runner 103. At least one bucket 105 may be connected/linked mechanically to the other end of the rod/bar 104. Each bucket 105 may be positioned at a predefined height such that the jet/stream of exhaust gases is directed to the bucket 105 and enters into the bucket 105. The jet/stream of exhaust gases may further enable rotation of the runner 103. In another embodiment, the bucket 105 may be connected to a ring-type element, wherein the ring-type element may be connected to the runner 105.

In one embodiment, the inlet port 108 of the turbine 102 may be connected to the outlet port 107 of the combustion chamber 101. A non-return valve 106 may be placed between the inlet port 108 of the turbine 102 and the outlet port 107 of the combustion chamber 101. The jet/stream of the exhaust gases may enter from the combustion chamber 101 to the casing/housing 102a and may be further directed to at least one bucket 105 present within the casing/housing 102a. The jet/stream may enable the runner 103 to start rotating in the clockwise direction, eventually rotating the axle of the vehicle. It can be said that such rotation of axle via the apparatus 100 may further provide rotation of one or more wheels of the vehicle.

Figure 2:
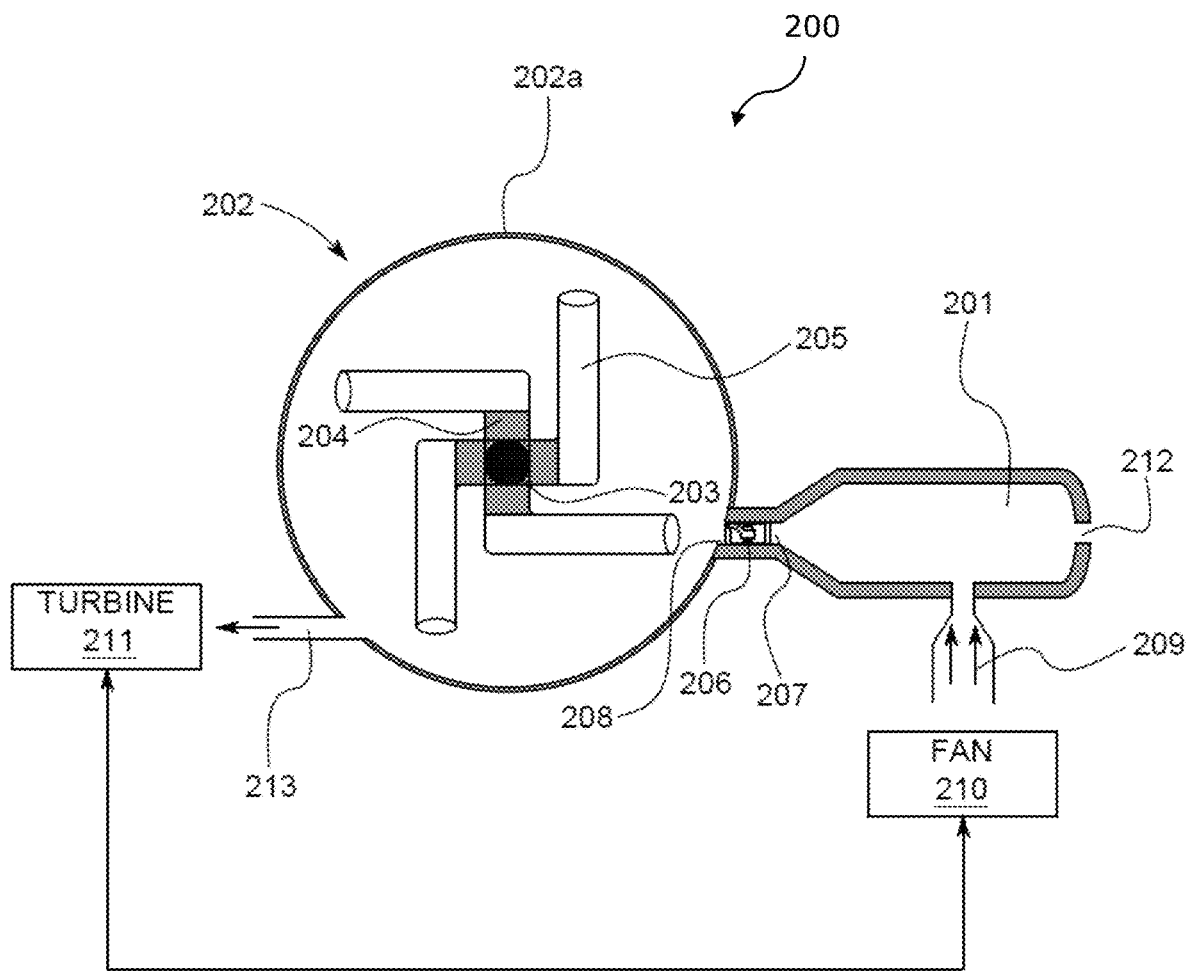
FIG. 2 illustrates an improved vehicle wheel rotation apparatus 200, in accordance to another embodiment of the present disclosure.

FIG. 2 illustrates an improved vehicle wheel rotation apparatus 200, in accordance to another embodiment of the present disclosure. The apparatus 200 may comprise a combustion chamber 201 and one or more turbines (202, 211). In one embodiment, an outlet 213 of the first turbine 202 may be connected to inlet of the second turbine 211. (Hereinafter "first turbine 202" may be referred as "turbine 202" and may be used interchangeably).

The combustion chamber 201 may comprise one or more inlet for fuel and air (209,212), and an outlet port 207. The air may enter the combustion chamber via the inlet port 209, wherein the air is supplied by a fan 210. The fan 210 may rotate in one direction and further enable compression of a fuel and air mixture. The combustion chamber 201 may be utilized for combustion/burning of fuel along with air, thus forming the exhaust gases. The outlet port 207 of the combustion chamber 201 may comprise a narrow opening that may further enable the exhaust gases to come out with high force and/or high velocity. In other words, the exit of the high velocity exhaust gases from the outlet port 207 of the combustion chamber 201 may also form a jet/stream of exhaust gases. In one embodiment, the runner of the second turbine 211 may be coupled to the fan/blower 209 via a shaft.

Each turbine (202,211) may comprise a casing/housing 202a, a runner 203, an inlet port 208, an outlet port 213, plurality of rods/bars 204 and plurality of tubes 205. The plurality of bars 204 may be attached to the runner 203 of each turbine. The runner 203 of the turbine 202 may be mounted on a shaft which may be also coupled to the shaft/axle of the vehicle in order to rotate the one or more wheels of the vehicle. The plurality of rods/bars 204 may be connected to the runner 203. One end of each rod/bar 204 may be connected to the runner 203. At least one tube 205 may be connected/linked mechanically to the other end of each rod/bar 204. Each tube 205 may be positioned at a predefined height such that the jet/stream of exhaust gases is directed to the tube 205 and in order to enter into the tube 205.

In one embodiment, the inlet port 208 of the turbine 202 may be connected to the outlet port 207 of the combustion chamber 201. A non-return valve 206 may be placed between the outlet port 207 of the combustion chamber 201 and inlet port 208 of the turbine 202.

The jet of exhaust gases from the outlet port 207 of the combustion chamber 201 passes towards the inlet port 208 of the turbine 202 via the non-return valve 206.

In one embodiment, the vehicle wheel rotation apparatus 200 may be characterized by at least one tube 205 that may be retrofitted at surface of each bar 204 present in each turbine (202,211). An axis of the at least one tube 205 and axis of the respective bar 204 may be in orthogonal alignment. The at least one tube 205 may be positioned at a predefined height of the bar 204, wherein the tube 205 is coaxial to the inlet port 208 of the turbine 202. In one embodiment, the shape of the at least one tube 205 may be selected from round, elliptical and square. The diameter of the at least one tube 205 may be at least equal to or greater than diameter of the inlet port 208 of the turbine 202.

One end of the at least one tube 205 may be closed with the bar 204 and other end enables entry of jet of exhaust gases into the tube 205, facilitating the plurality of bars 204 for initiating the rotation of the runner 203. The jet of exhaust gases entering the at least one tube 205 may further result in providing a thrust to the bar 204 to which the tube 205 is already connected/linked, thus providing additional rotations to the runner 203 and eventually to the one or more wheels of the vehicle. The thrust to the bar 204 may initiate after the bar 204 rotates by 90 degrees from the initial position at which the exhaust gases start entering the tube 205. In one embodiment, the additional rotation of the runner 203 may be increased by 10-15%.

Figure 3:
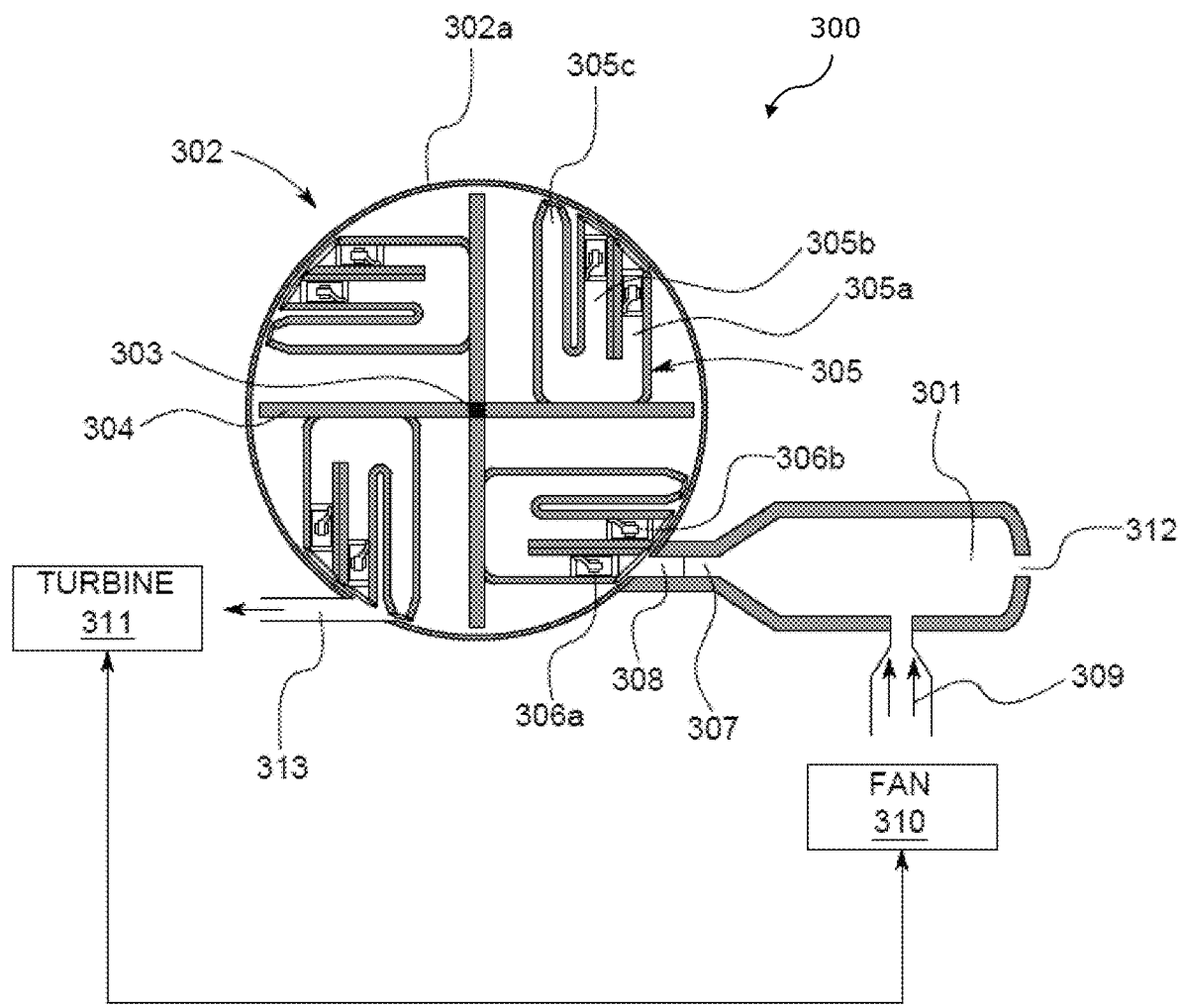
FIG. 3 illustrates an improved vehicle wheel rotation apparatus 300, in accordance to another embodiment of the present disclosure.

FIG. 3 illustrates an improved vehicle wheel rotation apparatus 300, in accordance to another embodiment of the present disclosure. The apparatus 300 may comprise a combustion chamber 301 and one or more turbines (302, 311). In one embodiment, an outlet port 313 of the first turbine 302 may be connected to an inlet port of the second turbine 311.

The combustion chamber 301 may comprise one or more inlet for fuel and air (312,309), and an outlet port 307. The air may enter the combustion chamber 301 via the inlet port 309, wherein the air is supplied by a fan 310. The fan 310 may rotate in one direction and further enable compression of a fuel and air mixture. The combustion chamber 301 may be utilized for combustion/burning of fuel along with air, thus forming the exhaust gases. The outlet port 307 of the combustion chamber 301 may comprise a narrow opening that may further enable the exhaust gases to come out with high force and/or high velocity. In other words, the exit of the high velocity exhaust gases from the outlet port 307 of the combustion chamber 301 may also form a jet/stream of exhaust gases. In one embodiment, the runner of the second turbine 311 may be coupled to the fan/blower 309 via a shaft.

Each turbine (302,311) may comprise a casing/housing 302a, a runner 303, an inlet port 308, an outlet port 313, plurality of rods/bars 304 and plurality of tubes 305. The plurality of bars 304 may be attached to the runner 303 of each turbine. The runner 303 of the turbine 302 may be mounted on a shaft at one end and other end of the shaft may be coupled to the shaft/axle of the vehicle in order to provide rotation to the one or more wheels of the vehicle. The plurality of rods/bars 304 may be connected/linked to the runner 303. In one embodiment, the inlet port 308 of the turbine 302 may be connected to the outlet port 307 of the combustion chamber 301.

The apparatus 300 may be characterized by an auxiliary attachment 305 that may be retrofitted at surface of each bar 304 present in each turbine. The auxiliary attachment 305 may comprise 3-tube arrangement, such that the one end of all tubes (305a, 305b, 305c) form an arc-shape for the auxiliary attachment 305. In one embodiment, the arc-shape of the auxiliary attachment 305 may coincide with the inner wall of the casing 302a. A predefined gap may be maintained between the auxiliary attachment 305 and the inner wall of the casing 302a, in order to enable entry and exit of gases from the auxiliary attachment 305.

Two tubes (305a, 305b) of the auxiliary attachment 305 may enable entry of jet of exhaust gases into the attachment 305 and further facilitating the plurality of bars 304 for initiating rotation of the runner 303. The two tubes (305a, 305b) of the auxiliary attachment 305 may be positioned at a predefined height such that one of the two tubes (305a, 305b) of the attachment 305 is coaxial to the inlet port 308 of the turbine 302. At least one non-return valve 306 may be placed (306a, 306b) are placed at entry of the two tubes (305a, 305b). The jet of exhaust gases from the combustion chamber 301 may pass/enter in the attachment 305 via the at least one non-return valve (306a, 306b). The jet of exhaust gases that exits the attachment 305 through last tube 305c, with reducing cross-section near opening, may further enable increment in velocity of exhaust gas, resulting in thrust to the bar 304 to which the attachment 305 is already fitted, thus providing additional rotations to the runner 303 and eventually to the one or more wheels of the vehicle. The thrust to the bar 304 may initiate after the bar 304 rotates by 90 degrees from the initial position at which the exhaust gases start entering the auxiliary attachment 305. The additional rotation of the runner 303 may be increased by 15-30%.

In one embodiment, diameter of all the tubes (305a, 305b, 305c) of the auxiliary attachment 305 may be equal to or larger than diameter of the inlet port 308 of the turbine. The diameter of all the tubes (305a, 305b, 305c) may be same. In another embodiment, the diameter of all the tubes (305a, 305b, 305c) may be different than each other.

In one embodiment, the tubes (305a, 305b, 305c) may further comprise one or more bends in order to provide direction to the exhaust gases, entering from the two tubes, towards the last tube for exiting from the auxiliary attachment 305. In another embodiment, shape of the tubes of the auxiliary attachment 305 may be selected from round, elliptical and square.

In one embodiment, the tube 305c may comprise a nozzle near one end of the tube from where the exhaust gases exit from the attachment 305. The thrust on the bar 304 may be created via the jet/stream of exhaust gases and the auxiliary attachment 305.

In one embodiment, the jet/stream of exhaust gases may be created either by a jet engine or the combustion chamber 301. The outlet port of the combustion chamber and the inlet port of the turbine may comprise either a nozzle and/or a narrow opening in order to pass the exhaust gases.

In another embodiment, the apparatus may be implemented for an airplane using jet engines. The apparatus 300 may be placed near the exhaust of the air plane, wherein hot gases come out from the airplane engine. In one embodiment, the combustion chamber may be replaced/removed. The exhaust gases may further enter the turbine 302. The shaft of the turbine 302, on which the runner 303 is installed, may be coupled to the second turbine 311. The second turbine 311 may work in opposite manner/direction as compared to a normal turbine. The plurality of rod/bars of the second turbine 311 may be fixed in such a way that the second turbine 311 will push the air to atmosphere in the opposite direction to movement of the air plane and the jet engine. The apparatus 300 may provide support to the jet engine for pushing back which will provide more reaction force in order to move the airplane in forward direction.

In an exemplary embodiment, the turbines (302, 311) may comprise respective shafts that are connected through gears in order to increase the speed of runner of the turbine 311. Therefore, the speed of the runner of the turbine 311 may be higher than that of runner 303 of the turbine 302.

In an exemplary embodiment, the apparatus (200,300) may be utilized as a primary or as secondary/additional apparatus that enables movement of the vehicle. The movement of the vehicle may be in forward or reverse direction by storage of energy/power within the apparatus, similar to use of flywheel in the four stroke engine that drives the vehicle. Furthermore, the jet/stream of the exhaust gases generated can also be utilized for different purposes.

In an exemplary embodiment, power from turbine may be extracted through output shaft in the apparatus (200,300). The shaft may drive an aircraft propeller or ground vehicle (not shown) after an appropriate step-down in a gearbox.

In yet another embodiment, the apparatus (100,200,300) may be utilized for reducing the existing speed of the vehicle by implementing the apparatus (100,200,300) such that the jet/stream of the exhaust gases tends to oppose the rotation of the axle of the vehicle.

In an exemplary embodiment, the apparatus (100,200, 300) may reduce the exhaust losses by implementing nozzles and valves, attached to the periphery of the casing.

Overall, the hot burned/exhaust gases leave combustion chamber, pass through first turbine and then through the bars of turbine. First turbine may further pass through second turbine. The second turbine may provide power to the fan/blower via a shaft. The fan/blower may provide fresh air to the combustion chamber.

In accordance with embodiments of the present disclosure, the vehicle wheel rotation apparatus, described above may have following advantages including but not limited to:
  Provides comparatively higher mileage than existing engine.
  Low maintenance cost and easy to replace, due to less number of parts.
  No complex arrangement required to run the vehicle.
  Can be retrofitted on the existing engines.
  Can work as an alternative to existing engines.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

LIST OF REFERENCE NUMERALS 101, 201,301—Combustion Chamber
102, 202, 302—Turbine/First Turbine
102a, 202a, 302a—Casing/housing
103, 203, 303—Runner
104, 204, 304—Rod/Bar
105—Bucket
205—Pipe
305—Auxiliary attachment
305a, 305b, 305c—tubes of Auxiliary attachment
106, 206, 306a, 306b—Non return valve
107, 207, 307—outlet port of combustion chamber
108, 208, 308—inlet port of turbine
109—outlet port of turbine
209, 309—inlet port combustion chamber for air
210, 310—Fan/Blower
211, 311—Second turbine
212, 312—inlet port combustion chamber for fuel
213, 313—outlet port of first turbine.

I claim:

1. An improved vehicle wheel rotation apparatus (300), comprising:
  a combustion chamber (301), wherein the combustion chamber (301) comprises one or more inlets for fuel and air (312,309), and an outlet port (307);
  one or more turbines (302,311), wherein each turbine comprises a casing (302a), a runner (303), a casing inlet port (307) and a casing outlet port (313), wherein a plurality of bars (304) are attached to the runner (303) of each turbine, wherein the runner (303) is mounted on one end of a shaft and the other end of the shaft is coupled to an axle of a vehicle;
  characterized in that, an auxiliary attachment (305) is retrofitted at a surface of each bar (304) present in each turbine, wherein the auxiliary attachment (305) comprises a 3-tube arrangement, wherein a first two tubes (305a, 305b) of the 3-tube arrangement enable entry of a jet of exhaust gases from the combustion chamber into the auxiliary attachment (305) and further facilitating the plurality of bars (304) for initiating rotation of the runner (303), wherein at least one non-return valve (306a, 306b) is placed at an entry of the two tubes (305a, 305b), wherein the jet of exhaust gases from the combustion chamber (301) passes in the auxiliary attachment (305) via the non-return valve (306a, 306b), wherein the jet of exhaust gases exits the auxiliary attachment (305) through the last tube (305c) of the 3-tube arrangement, with reducing cross-section near an opening of the last tube, enables further increment in velocity of exhaust gas, resulting in thrust to the bar (304) to which the auxiliary attachment (305) is fitted, thus providing additional rotations to the runner (303) and eventually to one or more wheels of the vehicle.

2. The improved vehicle wheel rotation apparatus as claimed in claim 1, wherein the additional rotations of the runner (303) increases by 15-30%.

3. The improved vehicle wheel rotation apparatus as claimed in claim 1, wherein the tubes (305a, 305b, 305c) of the auxiliary attachment (305) comprises one or more bends, in order to direct the exhaust gases, entering from the two tubes (305a, 305b), towards the last tube (305c) for exiting the auxiliary attachment (305).

4. The improved vehicle wheel rotation apparatus as claimed in claim 1, wherein the thrust to the bar (304) initiates after the bar (304) rotates by 90 degrees from a position at which the exhaust gases start entering the auxiliary attachment (305).

5. The improved vehicle wheel rotation apparatus as claimed in claim 1, wherein the two tubes (305a, 305b) of the auxiliary attachment (305) are positioned at a predefined height, wherein one of the two tubes (305a, 305b) of the auxiliary attachment (305) is coaxial to the casing inlet port (308) of the turbine (302).

6. The improved vehicle wheel rotation apparatus as claimed in claim 1, wherein air enters the combustion chamber (301) via the inlet (309), wherein air is supplied by a fan (310).

7. The improved vehicle wheel rotation apparatus as claimed in claim 1, wherein the casing outlet port (313) of a first turbine (302) of the one or more turbines is connected to a casing inlet port of a second turbine (311) of the one or more turbines.

8. The improved vehicle wheel rotation apparatus as claimed in claim 1, wherein a runner of a second turbine (311) of the one or more turbines is couples to a fan (310) via the shaft.

9. The improved vehicle wheel rotation apparatus as claimed in claim 1, wherein the shape of the tubes (305a, 305b, 305c) of the auxiliary attachment (305) is selected from round, elliptical and square.

10. The improved vehicle wheel rotation apparatus as claimed in claim 1, wherein a diameter of the tubes (305a, 305b, 305c) is equal to or greater than a diameter of the casing inlet port (308) of the turbine (302).

* * * * *